June 1, 1954  F. CARPENTER  2,679,952
CONDIMENT HOLDER
Filed April 7, 1950
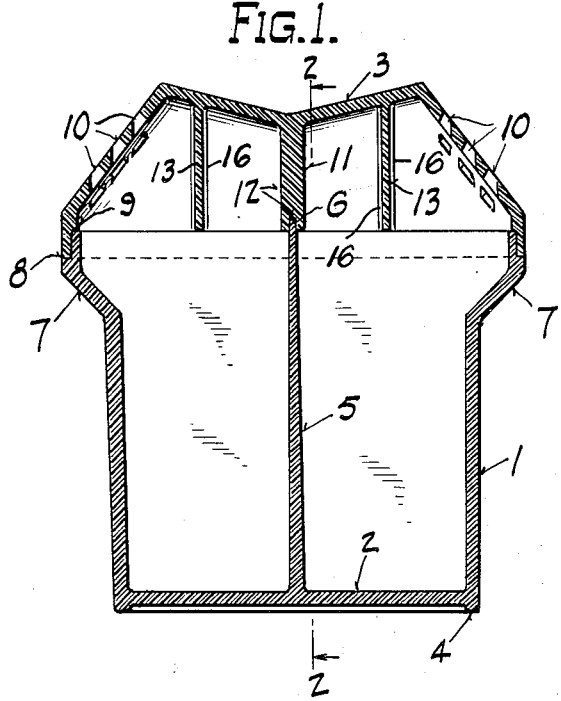
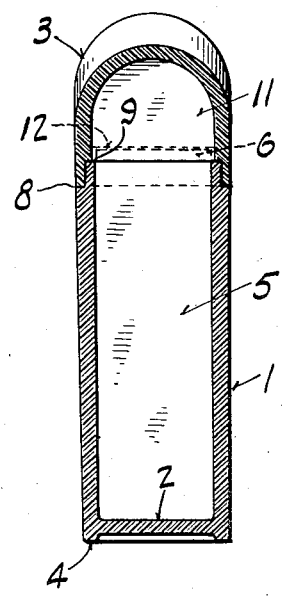
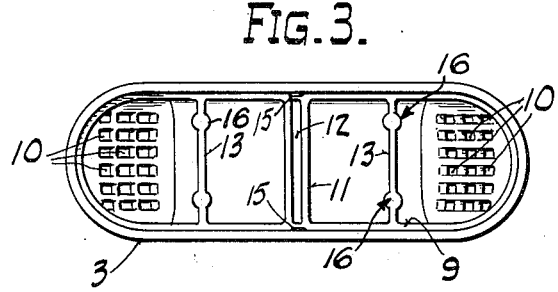
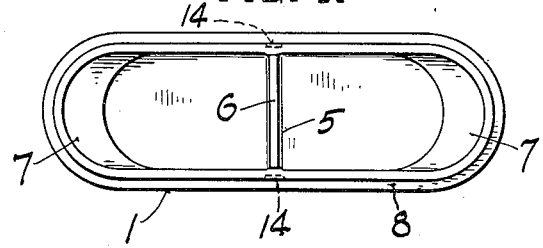
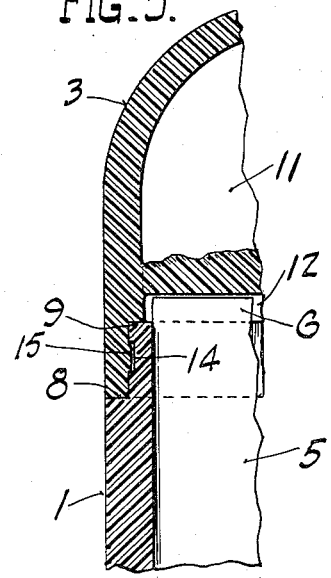
INVENTOR
FLOYD CARPENTER
BY *Andrus & Sceales*
ATTORNEYS.

Patented June 1, 1954

2,679,952

UNITED STATES PATENT OFFICE 2,679,952

CONDIMENT HOLDER

Floyd Carpenter, Baraboo, Wis.

Application April 7, 1950, Serial No. 154,681

1 Claim. (Cl. 222—142.4)

This invention relates to a condiment holder and particularly has reference to a condiment shaker unit which retains granular seasoning materials in separate compartment for selected discharge therefrom.

One object of the invention is to provide a condiment holder having several separate condiment confining compartments in which positive means is utilized to prevent sifting of the condiments from one compartment to the other.

A further object is to provide a condiment holder with a removable cover for filling the container, in which the partition joint between the cover and container is positively sealed at all times.

Another object is to provide a condiment shaker which is sealed against loss of the confined condiments through the joint between the container and cover.

A further object is to provide for steady flow of material selected to be discharged from the holder.

Another object is to provide a symmetrically balanced condiment container which rests on surfaces without readily tipping.

These and other objects of the invention will appear hereinafter in connection with the accompanying drawing illustrating an embodiment of the invention.

In the drawing:

Figure 1 is a vertical longitudinal sectional view of a condiment holder constructed in accordance with the invention;

Fig. 2 is a view taken on line 2—2 of Figure 1.

Fig. 3 is a top view looking into the cover;

Fig. 4 is a top view looking into the container; and

Fig. 5 is a fragmentary view of the detent between the cover and container.

In general, the container of the invention comprises an open-topped container or shell section separated into two compartments by a central partition so that seasoning material like salt may be confined in one compartment and pepper in the other compartment without contact with each other. The compartments are filled from the top of the container which is closed by a removable cover having perforations in line with a respective compartment for discharge of the seasoning selected. The cover is also partitioned and the invention is particularly directed to the interlocking connection between the partition of the cover and partition of the container to prevent seasoning from sifting through the joint between the partition from one compartment to the other.

The drawing illustrates a condiment holder comprising in general an elongated open-topped shell or container 1 closed at the bottom by an integrally formed bottom plate 2 and at the top by the removable cover or cap 3. Plate 2 is inset within the bottom of container 1 a slight distance to provide a flange 4 as a base on which the container is supported on a surface in a well balanced manner. Container 1 is substantially flat in appearance with the width thereof being considerably less in cross-section than the length. The end walls of the container are rounded.

Container 1 is divided centrally into two compartments by a transversely disposed partition 5 integrally formed with the flat walls and bottom head 2 thereof and extending longitudinally of the container and above the upper rim of the container a slight distance to provide a tongue 6, the use of which will be described hereinafter. Since partition 5 is integral with the walls and bottom of the container no seasoning material can sift from one compartment to the other in the container itself.

The upper portion of container 1 on each end is provided with the projecting lips 7 formed by flare of the wall of the container outwardly to better direct confined seasoning material for ready discharge.

The periphery of the rim of container 1 is provided with the encircling ledge 8 to receive and form a seat for the rim of cover 3 which fits over the container in overlapping relation therewith. Cover 3 has a corresponding ledge 9 on the inside thereof which seats on the upper face of the rim of the container. An overlapping joint between the cover and container of substantial depth is thus formed to prevent escape of seasoning material between the same.

The opposite ends of cover 3 taper downwardly complementary to the flared lips 7 of container 1 to provide each end of the holder in the nature of a spout for discharge of selected seasoning material from the compartment in which it is contained through perforations 10 provided in each tapered end of the cover.

Cover 3 is divided centrally into two compartments corresponding to those in container 1 by a partition 11 formed integrally with the walls of the cover and vertically aligned with partition 5 in container 1. Partition 11 is substantially thicker than partition 5 and has a transverse groove 12 in the lower face thereof about the width of partition 5 which when the cover and container are assembled receives tongue 6, previously described, and provided as the projecting upper end of partition 5. A tongue and groove interlock of substantial depth is thus provided between the cover and container permitting ready separation of these parts for filling the container and yet effectively sealing the partition joint therebetween against passage of granular seasoning material from one compartment to the other.

In order to strengthen cover 3 and aid in separating and guiding the seasoning material for discharge through perforations 10, baffles 13 having integral transversely spaced reinforcing ribs 16 are disposed vertically of the cover on each side of central partition 11 and equally spaced from the latter. These baffles along with partition 11 extend from the upper wall of the cap down to ledge 9.

In order to insure a tight fit between cover 3 and container 1, a detent locking construction is provided in the overlapping joint between the cover and container. This is shown as located on each side of the partitions 5 and 11 and comprises a socket 14 in the container and the projection 15 in the cover.

The holder of the invention may be formed of numerous different materials. A transparent plastic material has been found very satisfactory in service.

The invention provides a condiment holder in which positive means is employed to maintain separation of condiments in their respective compartments and yet permitting ready removal of the cover from the container for filling or cleaning.

Various embodiments of the invention may be employed with the scope of the following claim.

I claim:

A holder for confining condiments like salt and pepper in separate compartments for selected discharge therefrom which comprises, an open-topped container closed at the bottom, a partition extending longitudinally of the container and integral with the side walls and bottom to divide the container into two compartments for confining different condiments and with said partition extending above the upper rim of the container a slight distance and completely across the container, a removable cover assembled over the top of the container to close off the same and having perforated discharge openings therein on opposite sides and aligned with said separate compartments, a partition provided integrally with the cover completely across the cover and in alignment with the partition of the container to divide the cover into two compartments corresponding to those in the container, a groove extending completely across the exposed edge of the cover partition and receiving the projecting end of the container partition projection in overlapping relation to form a tongue and groove seal completely across the holder, baffle members projecting downwardly from the top of the cover to the upper rim of the container parallel to the walls of the container and intermediate the cover partition and the discharge openings on each side, said baffle members having transversely spaced reinforcing ribs formed integrally therewith, and projecting flared lips on each end of the container near the top thereof with the upper end of each line terminating at a line substantially below the lower end of each baffle to provide a passage of substantial size between each lip and baffle for passage of material to the discharge openings.

References Cited in the file of this patent

UNITED STATES PATENTS

| Number | Name | Date |
|---|---|---|
| 1,349,795 | Vogel | Aug. 17, 1920 |
| 1,362,442 | Schneider | Dec. 14, 1920 |
| 1,765,152 | Hart et al. | June 15, 1930 |
| 1,979,198 | Hart | Oct. 30, 1934 |
| 2,184,302 | Hull et al. | Dec. 26, 1939 |
| 2,216,345 | Haskin et al. | Oct. 1, 1940 |
| 2,424,978 | Hale | Aug. 5, 1947 |
| 2,431,049 | Killa | Nov. 18, 1947 |
| 2,482,327 | Dawson et al. | Sept. 20, 1949 |